Feb. 14, 1961  C. C. BAUERLEIN  2,971,533
PRESSURE OPERATED MIXING VALVE
Filed May 12, 1958

Inventor
Carl C. Bauerlein

United States Patent Office 2,971,533
Patented Feb. 14, 1961

2,971,533

PRESSURE OPERATED MIXING VALVE

Carl C. Bauerlein, Lincolnwood, Ill., assignor to The Dole Valve Company, Morton Grove, Ill., a corporation of Illinois Filed May 12, 1958, Ser. No. 734,539

1 Claim. (Cl. 137—607)

This invention relates to improvements in mixing valves, and more particularly relates to mixing valves of the pressure operated type particularly adapted for supplying water for home appliances and the like.

A principal object of the invention is to provide an improved form of mixing valve arranged with a view toward utmost simplicity and efficiency in construction and operation.

Another object of the invention is to simplify the mixing valves heretofore used for washing machines and the like by using a pressure operated diaphragm for controlling the flow of hot and cold water for mixing.

A still further object of the invention is to provide a more efficient form of pressure operated mixing valve in which a single diaphragm operated by pressure, controls the flow of hot and cold water through the inlet passageways therefor in the valve body and effects the delivery of hot, cold or tempered water, by the application of fluid under pressure to either side of the diaphragm.

Figure 1:
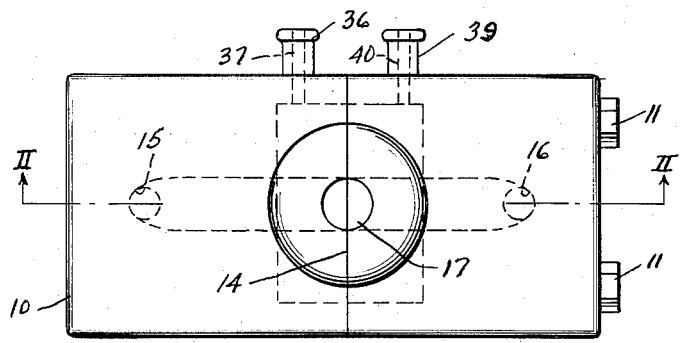
Figure 2:
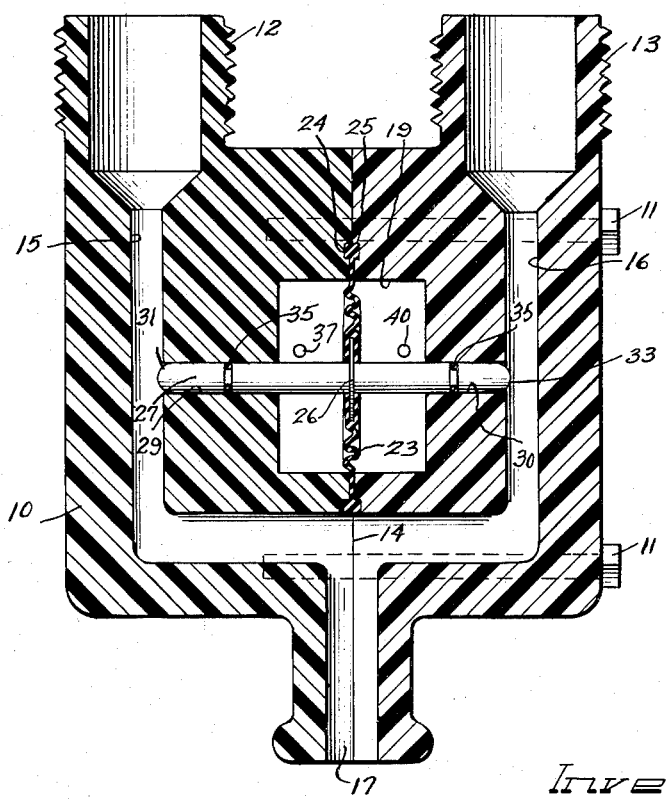

These and other objects of the invention will appear from time to time as the following specification proceeds and with reference to the accompanying drawing wherein:

Figure 1 is an end view of a mixing valve constructed in accordance with the invention; and Figure 2 is a horizontal sectional view taken substantially along line II—II of Figure 1.

In the embodiment of the invention illustrated in the drawings, I have shown a valve body 10, which may be made in two halves, retained together by machine screws 11 extending through one part of the body and threaded within the other part of the body. The two halves of the valve body may be sealed in any suitable manner. The sealing means is no part of the present invention so is not herein shown or described.

One half of the valve body has a threaded inlet connection 12 projecting therefrom for water at one temperature. The other half of the valve body has a threaded inlet connection 13 projecting therefrom, for water at a different temperature than the water entering the valve body through the inlet connection 12. The inlet connection 12 may be for cold water and has an inlet passageway 15 in communication therewith and leading into and along the valve body to a position adjacent the opposite end thereof from the inlet connection 12, and shown as turning at right angles to the valve body and opening to an inner face 14 thereof.

The inlet connection 13 may be for hot water and has an inlet passageway 16, like the passageway 15 in communication therewith and turning at right angles adjacent the end of the valve body opposite the inlet connection 13 and registering with the inlet passageway 15. The junctures of said inlet passageways provide a mixing chamber for mixing the hot and cold water flowing through said passageways, for discharge through a common outlet 17 leading from the inlet passageways 15 and 16.

The two halves of the valve body 10 also have a diaphragm or pressure chamber 19 therein, one half of said diaphragm chamber shown as being in one half the valve body, and the other half of said diaphragm chamber shown as being in the opposite half of the valve body. The diaphragm or pressure chamber 19 has a diaphragm 23 extending thereacross having an annular rib 24 at its periphery recessed within facing annular grooves 25 in the two halves of the valve body and sealing said chamber, when the two halves are clamped together by the machine screws 11.

The diaphragm 23 may be molded from rubber, an elastomer or the like, and may be molded to be biased in the central position shown, and has a central diaphragm plate 26, which may be molded therein. A valve or metering pin 27 is shown as being mounted in the diaphragm plate 26 intermediate the ends of said pin. The valve pin 27 is slidably mounted in aligned passageways 29 and 30 in the two halves of the valve body leading from the diaphragm chamber 19, and has a valve face 31 at one end thereof movable into the cold water passageway 15 to meter the flow of cold water therethrough and to entirely block the flow of cold water through said cold water passageway when the valve is in its closed position. The valve pin 31 also has a valve face 33 at the opposite end thereof movable within the hot water passageway 16 for metering the flow of hot water through said passageway and entirely shutting off the flow of hot water through said passageway, when said valve face is in a closed position. The valve faces 31 and 33 are generally hemispherical in form, the arc of which is struck from a radius, the same radius as the radius of the respective passageways 15 and 16 to engage the walls of said passageways and block the flow of hot or cold water therealong, when the valve is in its closed position. The valve pin 27 likewise has suitable sealing means, such as O-rings 35, recessed therein, and engaging the walls of the passageways 29 and 30, to seal said passageways from the passage of fluid under pressure from the diaphragm chamber 19, to the inlet passageways 15 and 16, and to seal said passageways from the passage of water from the passageways 15 and 16 into the diaphragm chamber 19.

An inlet fitting 36 for fluid under pressure is shown as extending from the valve body and as having communication with the diaphragm chamber 19 on one side of the diaphragm 23, through an inlet passageway 37. An inlet fitting 39 like the inlet fitting 36 extends from the valve body 10 and affords communication with the diaphragm chamber 19 on the opposite side of the diaphragm from the inlet fitting 36, through a pressure passageway 40.

Air or any other fluid under pressure may thus be admitted into the pressure chamber 19 on either or both sides of the diaphragm 23, to move either of the metering valves into operative association with respect to passageways 15 or 16, and meter or block the flow of water therethrough.

It may thus be seen that I have provided a simplified form of pressure operated mixing valve, which may deliver hot, cold or mixed water for the washing of clothes and like operations, and that the valve is of an extremely simple construction with a minimum of moving parts, the temperature of the water being controlled by the admission of fluid under pressure to one side or the other of a diaphragm.

It should here be understood that in referring to air or fluid under pressure that the pressure may be positive or negative pressure and that the valve will operate as well under negative pressure as under positive pressure.

While I have herein shown and described one form in which my invention may be embodied, it is readily understandable that various variations and modifications of the invention may be effected without departing from the spirit and scope of the novel concepts thereof.

I claim as my invention:

In a tempering valve for water and the like, a two part valve body having a hot water inlet passageway leading into one part thereof, and a cold water inlet passageway leading into the other part thereof in generally parallel relation with respect to said hot water inlet passageway, a common outlet leading from said valve body along the joint between the halves thereof, a diaphragm chamber in each part of said valve body between said inlet passageways, a pin slidably extending through said diaphragm chamber and guided in each of said body parts at opposite ends of said diaphragm chamber for movement axially of said diaphragm chamber and transversely of said inlet passageways and having valve means on opposite ends thereof metering the flow of hot and cold water through said passageways, said valve means comprising hemispherical valve faces struck from radii equal to the radius of said passageways to conform to half of the cylindrical wall of each passageway, fluid pressure inlets in each body part leading to opposite sides of said diaphragm chamber, a diaphragm extending across said diaphragm chamber at the juncture of said body parts and having an outer annular rib recessed within adjacent faces of said body parts and also having a central diaphragm plate having connection with said metering pin for operating said metering pin and the hemispherical valves on opposite ends thereof to control the flow of water along said passageways and the delivery of water through said outlet, and means securing the parts of said valve body together and bringing the annular rim of said diaphragm into sealing engagement with the adjacent faces of said valve body.

References Cited in the file of this patent

UNITED STATES PATENTS

| | | |
|---|---|---|
| 2,145,133 | Riney | Jan. 24, 1939 |
| 2,174,965 | Burdick | Oct. 3, 1939 |
| 2,598,180 | Kenyon | May 27, 1952 |
| 2,708,071 | Burhop | May 10, 1955 |
| 2,718,840 | Lyman | Sept. 27, 1955 |

FOREIGN PATENTS

| | | |
|---|---|---|
| 1,019,538 | France | Oct. 29, 1952 |